United States Patent
Mukai et al.

(10) Patent No.: US 6,801,191 B2
(45) Date of Patent: Oct. 5, 2004

(54) INPUT DEVICE AND INPUTTING METHOD WITH INPUT DEVICE

(75) Inventors: Masaki Mukai, Nishinomiya (JP);
Atsushi Tanaka, Moriguchi (JP);
Osamu Sameshima, Moriguchi (JP);
Osamu Kamo, Kobe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 334 days.

(21) Appl. No.: 09/843,029

(22) Filed: Apr. 27, 2001

(65) Prior Publication Data

US 2002/0158851 A1 Oct. 31, 2002

(51) Int. Cl.$^7$ ............................................. G09G 5/00
(52) U.S. Cl. ....................... 345/179; 345/173; 178/18.01
(58) Field of Search .................. 345/179, 173, 345/174, 177, 182; 178/18–20

(56) References Cited

U.S. PATENT DOCUMENTS

| | | | | |
|---|---|---|---|---|
| 5,396,443 A | * | 3/1995 | Mese et al. ............... | 713/321 |
| 5,825,352 A | * | 10/1998 | Bisset et al. ............. | 345/173 |
| 6,225,986 B1 | * | 5/2001 | Sato et al. ............... | 345/178 |
| 6,346,935 B1 | * | 2/2002 | Nakajima et al. ......... | 345/173 |
| 6,610,936 B2 | * | 8/2003 | Gillespie et al. ......... | 178/18.01 |

* cited by examiner

Primary Examiner—Guy J. Lamarre
Assistant Examiner—Fritz Alphonse
(74) Attorney, Agent, or Firm—McDermott Will & Emery LLP (57) ABSTRACT

An input device is provided which is capable of entering a double tap operation even if an operation through a touch panel is performed in difficulty. The input device includes a coordinate acquiring section, a pressure acquiring section, a coordinate condition storing section, an on-pressure storing section for storing a first pressure and a second pressure smaller than the first pressure, a time condition storing section, and an input judging section. In operation, the pressure of the first pen touch operation detected by the pressure acquiring section exceeds a first pressure. Then, if the pressure of the second pen touch operation detected by the pressure acquiring section exceeds the second pressure within a certain time stored in the time condition storing section, and if the second pen touch operation is performed within a distance stored in the coordinate condition storing section, the input judging section qualifies the two consecutive pen touch operations as a double tap operation. As the threshold of the pressure of the second pen touch operation is smaller than an ordinary pressure, the double tap operation can correctly be identified even if the pressure of the second pen touch operation by any user becomes small.

66 Claims, 4 Drawing Sheets

INPUT DEVICE AND INPUTTING METHOD WITH INPUT DEVICE

FIELD OF THE INVENTION

The present invention relates to an input device used in a personal computer, a portable data terminal, and a home appliance, and to an inputting method with the input device.

BACKGROUND OF THE INVENTION

Data processing technologies have been improved, electronic devices have a higher performance and lower cost, and information services over the Internet have been accordingly expanded worldwide. In particular, each information apparatus such as a portable data terminal designed for using at an outside location is equipped with no keyboard, which is installed in a PC, but a touch panel operated with a pen or the like. The touch panel is widely employed as an inputting device especially for elder people and children.

In an information apparatus, such as a portable data terminal, equipped with a touch panel, repeating to input data with a pen twice in a particular area of the touch panel within a particular interval time is qualified as a "double tap operation". The apparatus often operates at the double tap in a different manner than a single-tap operation for inputting data. For the double tap operation, the touch panel has to be touched with the pen at a slightly greater pressure than a certain amount, the pressure then decreases below the amount, and then, the same operation at slightly greater pressure than the certain amount has to be performed within a certain interval time at a position within a particular distance from a position of the first tap.

When a user securely holds the touch panel of the portable data terminal, the user is conscious of tapping the panel twice at substantially the same position within a short time. The consciousness may however make the user tap the panel with the pen at an adequate pressure for the first tap but at a less pressure for the second tap. The consciousness may also make the user perform the second tap without leaving the pen enough from the panel after the first tap. As a result, the user often fails to perform the double tap operation.

SUMMARY OF THE INVENTION

An input device and an inputting method are provided in which a user inputs a data with a double tap operation even when the user performs the second tap at a small pressure. A pressure for a valid second tap of a double tap operation is smaller than that for a valid first tap.

An input device, an inputting method, and a recording medium for storing a program of the inputting method are provided in which a user inputs data with a double tap operation even when the user does not decrease a pressure after the first tap. A pressure for judging that the first tap is released is set greater than an ordinary pressure.

DETAILED DESCRIPTION OF THE PREFERRED EMBODIMENTS

First Exemplary Embodiment

Figure 1:
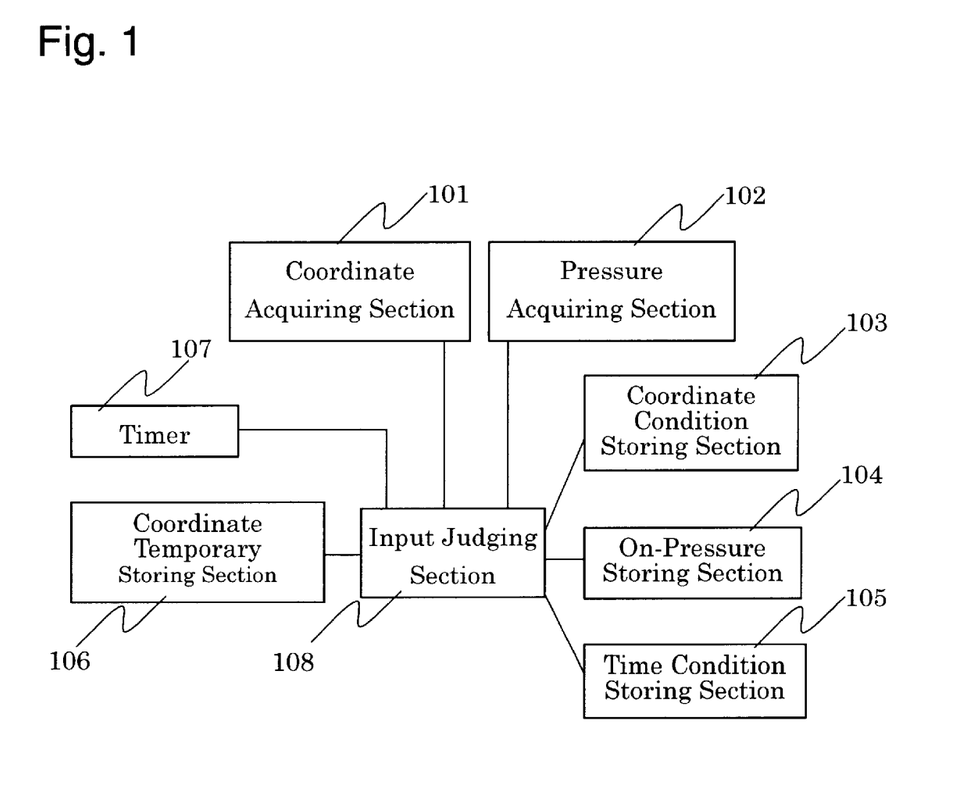
FIG. 1 is a block diagram of an input device according to a first exemplary embodiment of the present invention.

FIG. 1 is a block diagram of an input device according to a first exemplary embodiment of the present invention. The input device includes an input unit, touch panel, for detecting a coordinate (an operating position) and a pressure (an amount of the operation) input by a user.

As shown in FIG. 1, a coordinate acquiring section 101 is connected to the touch panel for acquiring the coordinate of a position on the touch panel where the user touches the panel with a pen (referred to as a pen touch operation hereinafter). Also, a pressure acquiring section 102 is connected to the touch panel for acquiring a pressure of the pen touch operation. The coordinate acquiring section 101 and the pressure acquiring section 102 monitor the touch panel at an equal interval time to detect the coordinate and the pressure, respectively.

A coordinate condition storing section 103 stores a condition of a distance between two pen touch operations. It is examined whether or not a double tap operation is performed with two pen touch operations within a predetermined interval time based on the condition. The condition for the double tap operation is that the distance between any two consecutive pen touch operations in the coordinate system is smaller than L.

An on-pressure storing section 104 stores a condition of a pressure of a pen touch operation. Based on the condition, the pen touch operation is judged to be valid. The section 104 stores, as the condition, a pressure P1, a lower limit of the pressure used for examining the second pen touch operation, and a pressure P2, another lower limit of the pressure used for examining other operations (P1<P2). Even if the pressure of the second pen touch operation of two pen touch operations is smaller than that of the first pen touch operation, the second pen touch operation is qualified as a double tap operation with the first pen touch operation.

A time condition storing section 105 stores an upper limit time T during which two successive pen touch operations qualified as the double tap operation are performed.

A coordinate temporary storing section 106 temporarily stores a coordinate detected by the coordinate acquiring section 101.

A timer 107, responsive to a stating command including the upper limit time T, counts time to detect the time T passes.

An input judging section 108 judges whether the pen touch operation is performed once (referred to as "a single tap operation" hereinafter) or repeated twice for the double tap operation based on outputs of and data in the section 101 through section 106. The output of the input judging section 108 thus includes the type of an operation, i.e., a single tap or double tap operation, and the coordinate of a position of the operation. The input judging section 108 includes a temporary storing section for temporarily storing the acquired data in the coordinate acquiring section 101 and the pressure acquiring section 102 just before an operation. The input judging section 108 contains a flag indicating whether the double tap operation has been detected or not.

Figure 2:
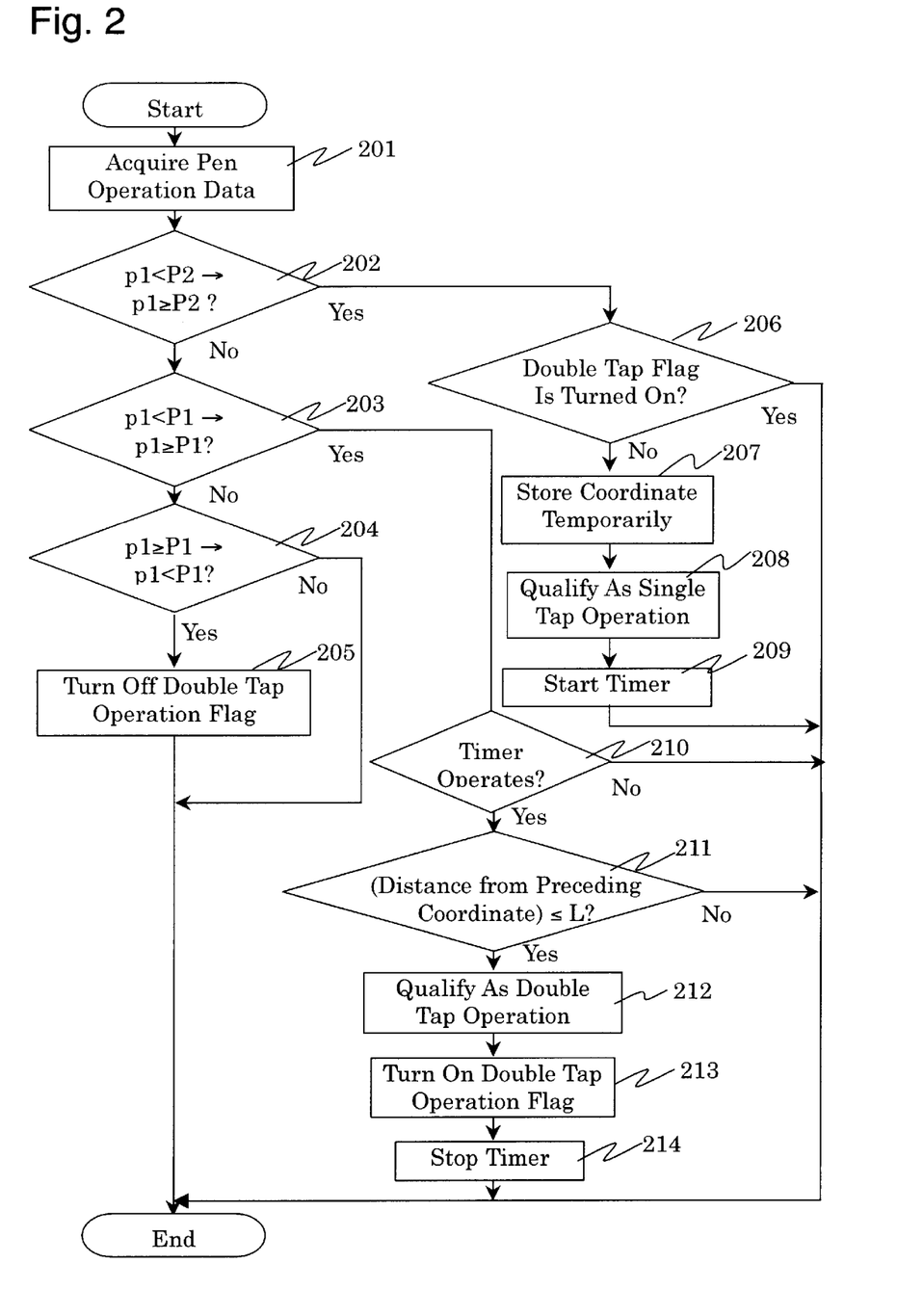
FIG. 2 is a flowchart illustrating an operation of the input device according to the first embodiment.

An operation of the input device according to this embodiment, where the coordinate acquiring section 101 and the pressure acquiring section 102 receives data from the touch panel, will now be described referring to a flowchart in FIG. 2.

The coordinate acquiring section 101 and the pressure acquiring section 102 detect a coordinate c1 and a pressure p1 of a pen touch operation, respectively (Step 201).

The input judging section 108 examines whether a condition $p0<P2 \leq p1$ is satisfied or not, where p0 is a pressure just before the operation (Step 202).

If the condition $p0<P2 \leq p1$ is not satisfied at Step 202, the input judging section 108 examines whether a condition $p0<P1 \leq p1$ is satisfied or not (Step 203).

If the condition $p0<P1 \leq p1$ is not satisfied at Step 203, the input judging section 108 examines whether a condition $p0 \geq P1>p1$ is satisfied or not (Step 204). If the condition is not satisfied, the operation terminates.

If the condition $p0 \geq P1>p1$ is satisfied at Step 204, a flag in the input judging section 108 indicating that the double tap operation has been detected is turned off (Step 205), and the operation terminates.

If the condition $p0<P2 \leq p1$ is satisfied at Step 202, the input judging section 108 examines whether the flag indicating that the double tap operation has been detected is turned on or not (Step 206). If it is turned on, the operation terminates.

If the flag is turned off, the input judging section 108 makes the coordinate temporary storing section 106 store the coordinate c1 (Step 207).

The input judging section 108 qualifies the pen touch operation as a single tap operation at the coordinate c1 (Step 208).

The input judging section 108 makes the timer 107 start counting the time T stored in the time condition storing section 105 (Step 209), and the operation terminates.

If the condition $p0<P1 \leq p1$ is satisfied at Step 203, the input judging section 108 examines whether the timer 107 operates or not (Step 210). If it does not operate, the operation terminates.

If the timer 107 operates at Step 210, the input judging section 108 examines whether or not a distance between the coordinate c1 and a coordinate c0 stored in the coordinate temporary storing section 106 is smaller than the reference distance L stored in the coordinate condition storing section 103 (Step 211). If it is not smaller than the distance L, the operation terminates.

If the distance between the coordinates c0 and c1 is smaller than the distance L at Step 211, the input judging section 108 qualifies the pen touch operation performed after the preceding pen touch operation as a double tap operation at the coordinate c0 (Step 212).

The input judging section 108 turns on the flag indicating that the double tap operation has been detected (Step 213).

Then, the input judging section 108 makes the timer 107 stop (Step 214), and the operation terminates.

Actual operations of the input device will be explained when the pen touch operation is performed on the touch panel.

Operation Example 1-1
Conditions:
(1-1-1) The coordinate temporary storing section 106 stores the coordinate c0;
(1-1-2) The timer 107 operates;
(1-1-3) The input judging section 108 stores the preceding pressure p0 satisfying $p0<P1$ and turns off the flag indicating that the double tap operation has been detected; and
(1-1-4) The coordinate acquiring section 101 and the pressure acquiring section 102 detect the coordinate c1 located apart from the coordinate c0 by a distance smaller than L and the pressure p1 satisfying $P1<p1 \leq P2$, respectively.

Operations:
(1) The coordinate acquiring section 101 and the pressure acquiring section 102 detects the coordinate c1 and the pressure p1, respectively;
(2) The input judging section 108 judges that a pressure with the pen changes from a pressure smaller than P1 to that not smaller than P1;
(3) The input judging section 108 examines whether the timer 107 operates or not;
(4) It is examined whether or not the distance between the coordinate c1 and the coordinate c0 stored in the coordinate temporary storing section 106 is smaller than the distance L because the timer 107 operates;
(5) The input judging section 108 qualifies the pen touch operation as the double tap operation at the coordinate c0;
(6) The input judging section 108 turns on the flag indicating that the double tap operation has been detected; and
(7) The input judging section 108 makes the timer 107 stop.

Operation Example 1-2
Conditions:
(1-2-1) The coordinate temporary storing section 106 stores the coordinate c0;
(1-2-2) The timer 107 does not operates;
(1-2-3) The input judging section 108 stores the preceding pressure p0 satisfying $p0<P2$ and turns off the flag indicating that the double tap operation has been detected; and
(1-2-4) The coordinate acquiring section 101 and the pressure acquiring section 102 detect the coordinate c1 located apart from the coordinate c0 by a distance smaller than L and the pressure p1 satisfies $P2 \leq p1$, respectively.

Operations:
(1) The coordinate acquiring section 101 and the pressure acquiring section 102 detects the coordinate c1 and the pressure p1, respectively;
(2) The input judging section 108 judges that a pressure with the pen changes from a pressure smaller P2 to that not smaller than P2;
(3) The input judging section 108 examines whether the double tap operation has been detected or not;
(4) As the double tap operation has not been detected, the coordinate temporary storing section 106 stores the coordinate c1;
(5) The input judging section 108 qualifies the pen touch action as the single tap operation at the coordinate c1; and
(6) The input judging section 108 makes the timer 107 start counting.

As apparent particularly from the operation example 1-1, the two consecutive pen touch operations can be qualified as a double tap operation even if the pressure of the second pen touch operation is smaller than the ordinary pressure. At that moment, a distance between the two coordinate positions is smaller than the reference distance, and the interval time between the two consecutive pen touch operations is smaller than the predetermined time.

According to the embodiment, the threshold of the pressure for judging that the second pen touch operation of the double tap operation is valid is smaller than an ordinary pressure. The second pen touch operation of a double tap operation, such as an input operation with a pen on the touch panel of a portable data terminal, inclines to be performed unstably. Even if a pressure on the touch panel is less than a pressure of the first pen touch operation due to the unstable second pen touch operation, the operations is qualified as the double tap operation securely.

According to the embodiment described above, the first and second pen touch operations of the double tap operation are valid when the pressures of the fist and second operations exceed P2 and P1, respectively, and based on this time condition, the timer operates. However, for example, the timer may operate based on an interval time from the first pen touch operation at the pressure greater than P2 to the release of the second pen touch operation. As described in above, a condition under which the pen touch operation is valid and the interval time is measured may be set variously.

According to the above embodiment, the two consecutive pen touch operations are qualified as a double tap operation if the positions of the first and second operations are not located apart from each other by a predetermined distance. A coordinate of the double tap operation is that of the first pen touch operation. A coordinate of the double tap operation may however be that of the second pen touch operation or a center of the two consecutive pen touch operations.

According to the embodiment, the timer starts counting when the pressure of the first pen touch operation exceeds P2. The input device may include a peak detector for detecting a peak of the pressure of the pen touch operation. The timer may start counting when the peak of the pressure of the first pen touch operation is detected after the pressure exceeds P2. The timer may also start counting when the pressure of the first pen touch operation changes from more than a predetermined pressure to less than the predetermined pressure.

According to the embodiment, the pressure acquiring section detects a pressure to the touch panel with a pen as an amount of the operation. The amount of the operation may be duration of the pen touch operation instead of the pressure of the operation.

According to the embodiment, the input device includes the touch panel to which data is input. However, the device is not limited to include the touch panel. For example, the device may include a microphone instead of the touch panel and judge the double tap operation based on a magnitude of voice received with the microphone as the amount of the operation.

Second Exemplary Embodiment

Figure 3:
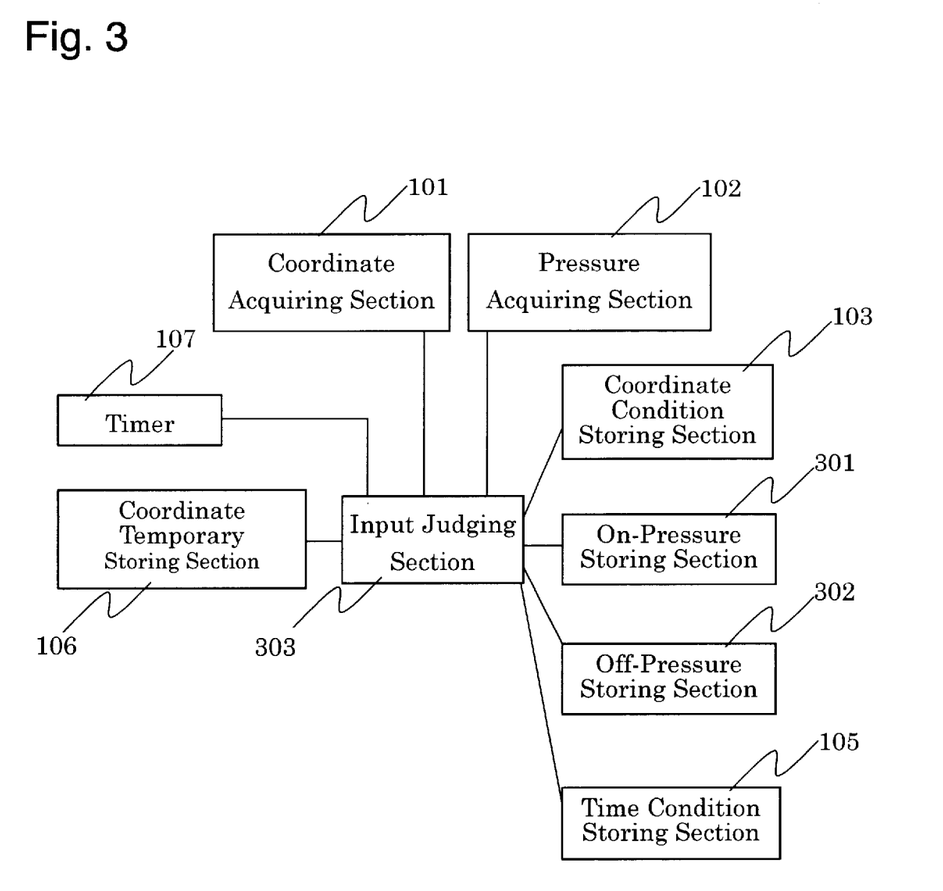
FIG. 3 is a block diagram of an input device according to a second exemplary embodiment of the present invention.

FIG. 3 is a block diagram of an input device according to a second exemplary embodiment of the present invention. The input device of this embodiment, similarly to that of the first embodiment, includes a touch panel with which a coordinate and a pressure of an operation performed by a user are detected.

In FIG. 3, components denoted with the same reference numbers in the first embodiment functions the same as that of the first embodiment.

An on-pressure storing section 301 stores a condition of a pressure of a pen touch operation. Based on the condition, the pen touch operation is judged to be valid. The section 301 stores, as the condition, a pressure P3 used for examining that the second pen touch operation of a double tap operation changes from being invalid to being valid and a pressure P5 used for examining that other pen touch operations change from being invalid to being valid.

An off-pressure storing section 302 stores a condition of a pressure of a pen touch operation. Based on the condition, the pen touch operation is judged to be invalid. The section 302 stores a pressure P4 used for examining that the first pen touch operation of the double tap operation changes from being valid to being invalid and the pressure P5, which is used for examining that other pen touch operations change from being valid to being invalid. The pressure P5 is equal to that stored in the on-pressure storing section 301. The pressures P3, P4, and P5 satisfies the relationship P3>P4>P5.

Even if the pressure of the first pen touch operation of two touch operations does not decline enough, the second pen touch operation exceeding a certain pressure is qualified as a double tap operation with the first pen touch operation.

An input judging section 303 examines whether the pen touch operation on the touch panel is qualified as a single tap operation or a double tap operation based on outputs of and data in the sections 101 through 103, sections 105 through 107, and sections 301 and 302. As a resultant judgement, the section 303 releases the type of the operation, i.e., the single tap or the double tap, and the coordinate of the operation. The input judging section 303 includes a temporary storing section for temporarily storing preceding data detected by the coordinate acquiring section 101 and the pressure acquiring section 102. The input judging section 303 includes a flag indicating whether the pen touch operation is in temporarily off or not.

Figure 4:
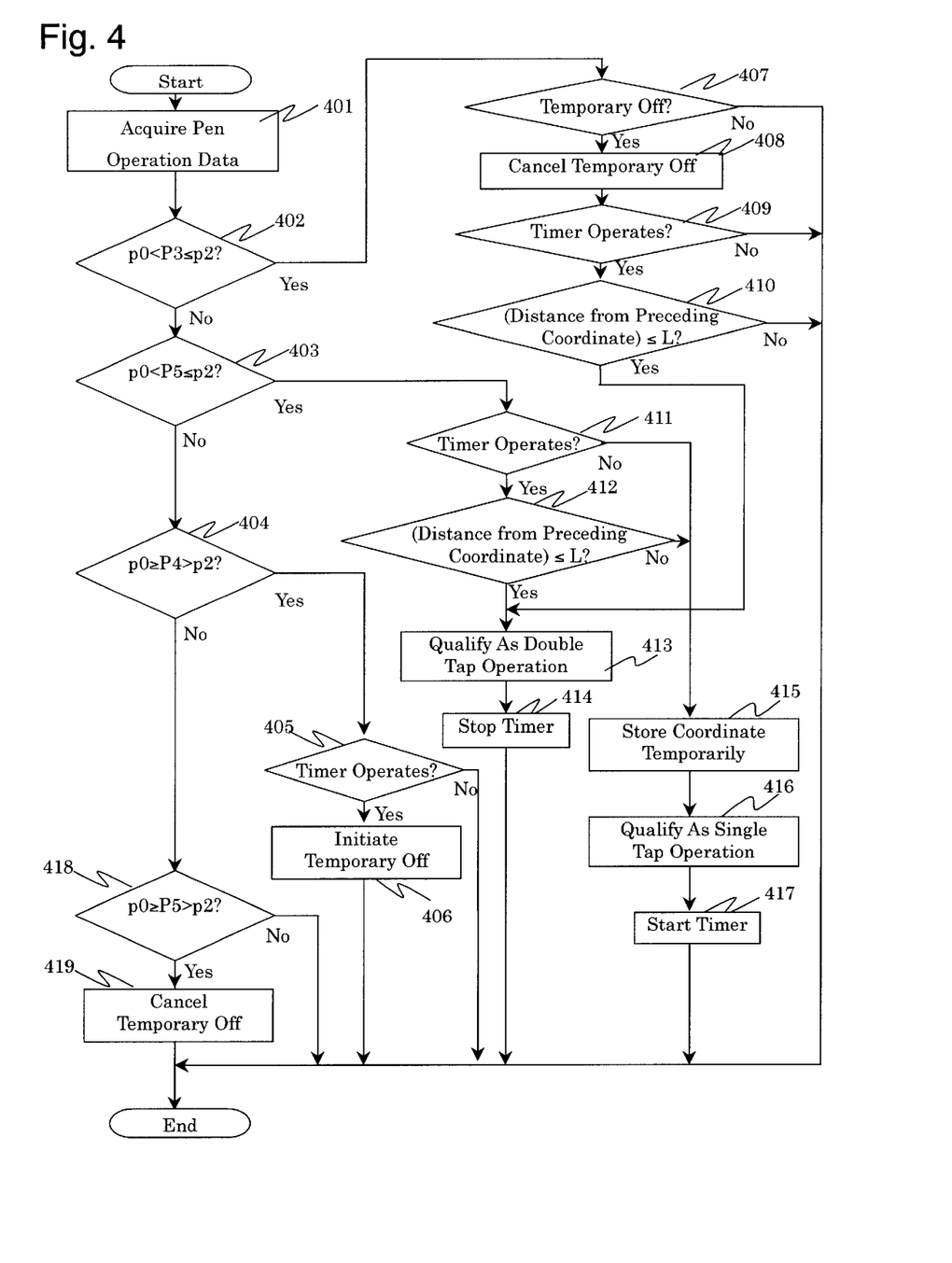
FIG. 4 is a flowchart of an operation illustrating the input device according to the second embodiment.

An operation of the input device of the second embodiment having the above arrangement, where the coordinate acquiring section 101 and the pressure acquiring section 102 receives data from the touch panel, will now be described referring to a flowchart in FIG. 4.

The coordinate acquiring section 101 and the pressure acquiring section 102 detect a coordinate c2 and pressure p2 of a pen touch operation, respectively (Step 401).

The input judging section 303 examines whether a condition p0<P3≦p2 is satisfied or not, where p0 is a pressure just before the operation (Step 402).

If the condition p0<P3≦p2 is not satisfied at Step 402, the input judging section 303 examines whether a condition p0<P5≦p2 is satisfied or not (Step 403).

When the condition p0<P5≦p2 is not satisfied at Step 403, the input judging section 303 examines whether a condition p0≧P4>p2 is satisfied or not (Step 404).

When the condition p0≧P4>p2 is satisfied at Step 404, the input judging section 303 examines whether the timer 107 operates or not (Step 405), and if it does not operate, the operation terminates.

If judging that the timer 107 operates at Step 405, the input judging section 303 initiates a temporary off-state (Step 406), and the operation terminates.

If the condition p0<P3≦p2 is satisfied at Step 402, the input judging section 303 examines whether the temporary off-state is initiated or not (Step 407). If it is not initiated, the operation terminates.

If judging, at Step 407, that the temporary off-state is initiated, the input judging section 303 cancels the temporary off-state (Step 408).

The input judging section 303 examines whether the timer 107 operates or not (Step 409). If it does not operate, the operation terminates.

If the timer 107 operates at Step 409, the input judging section 303 examines whether or not a distance between the coordinate c2 and the coordinate c0 stored in the coordinate temporary storing section 106 is smaller than a reference distance L stored in the coordinate condition storing section 103 (Step 410). If it is not smaller than the distance L, the operation terminates.

If the condition p0<P5≦p2 is satisfied at Step 403, the input judging section 303 examines whether the timer 107 operates or not (Step 411).

If the timer 107 operates at Step 411, the input judging section 303 examines whether the distance between the coordinate c2 and the coordinate c0 stored in the coordinate temporary storing section 106 is smaller than the reference distance L stored in the coordinate condition storing section 103 (Step 412).

If judging, at Step 412 or Step 410, that the distance between the coordinates c0 and c2 is smaller than the distance L, the input judging section 303 qualifies the pen touch operation in combination with the preceding pen touch operation as a double tap operation at the coordinate c0 (Step 413).

The input judging section 303 makes the timer 107 stop (Step 414), and the operation terminates.

If judging, at Step 412, that the distance between the coodinates c0 and c2 is not smaller than the distance L, or if judging, at Step 411, that the timer 107 does not operates, the input judging section 303 temporarily stores the coordinate c2 in the coordinate temporary storing section 106 (Step 415).

The input judging section 303 qualifies the pen touch operation as a single tap operation at the coordinate c1 (Step 416).

The input judging section 303 makes the timer 107 start counting and stop after the time T stored in the time condition storing section 105 (Step 417), and the operation terminates.

If the condition $p0 \geq P4 > p2$ is not satisfied at Step 404, input judging section 303 examines whether $p0 \geq P5 > p2$ is satisfied or not (Step 418). If it is not satisfied, the operations terminates.

If judging, at Step 418, that the condition $p0 \geq P5 > p2$ is satisfied, the input judging section 303 cancels the temporary off-state (Step 419), and the operation terminates.

Actual operations of the input device of the second embodiment will be explained when the pen touch operation is performed on the touch panel.

Operation Example 2-1
Conditions:
- (2-1-1) The coordinate temporary storing section 106 stores the coordinate c0;
- (2-1-2) The timer 107 operates;
- (2-1-3) The input judging section 303 stores the preceding pressure p0 satisfies $P4 \leq p0 < P3$, and the temporary off-state is initiated; and
- (2-1-4) The coordinate acquiring section 101 and the pressure acquiring section 102 detect the coordinate c1 located apart from the coordinate c0 by a distance smaller than L and the pressure p1 satisfies $P3 \leq p1$, respectively.

Operations:
(1) The coordinate acquiring section 101 and the pressure acquiring section 102 detects the coordinate c1 and the pressure p1, respectively.
(2) The input judging section 303 judges that a pressure with the pen changes from a pressure smaller than P3 to that not smaller than P3.
(3) The input judging section 303 cancels the temporary-off state and then examines whether the timer 107 operates or not, as the temporary-off state is initiated.
(4) It is examined whether or not the distance between the coordinate c1 and the coordinate c0 stored in the coordinate temporary storing section 106 is smaller than the distance L because the timer 107 operates.
(5) The input judging section 303 qualifies the pen touch operation as the double tap operation at the coordinate c0.
(6) The input judging section 303 makes the timer 107 stop.

Operation Example 2-2
Conditions:
- (2-2-1) The coordinate temporary storing section 106 stores the coordinate c0;
- (2-2-2) The timer 107 operates;
- (2-2-3) The input judging section 303 stores the preceding pressure p0 satisfying $p0 < P5$ and does not initiate the temporary off-state; and
- (2-2-4) The coordinate acquiring section 101 and the pressure acquiring section 102 detects the coordinate c1 located apart from the coordinate c0 by a distance smaller than L and the pressure p1 satisfying $P5 \leq p1$, respectively.

Operations:
(1) The coordinate acquiring section 101 and the pressure acquiring section 102 detects the coordinate c1 and the pressure p1, respectively.
(2) The input judging section 303 judges that a pressure with the pen changes from a pressure smaller than P5 to that not smaller than P5.
(3) It is examined whether or not the distance between the coordinate c1 and the coordinate c0 stored in the coordinate temporary storing section 106 is smaller than L because the timer 107 is in operation.
(4) The input judging section 303 qualifies the pen touch operations as the double tap operation at the coordinate c0.
(5) The input judging section 303 makes the timer 107 stop.

Operation Example 2-3
Condition:
- (2-3-1) The coordinate temporary storing section 106 stores the coordinate c0;
- (2-3-2) The timer 107 does not operates;
- (2-3-3) The input judging section 303 stores the preceding pressure p0 satisfies $P4 \leq p0 < P3$ and initiates the temporary off-state; and
- (2-3-4) The coordinate acquiring section 101 and the pressure acquiring section 102 detects the coordinate c1 located apart from the coordinate c0 by a distance smaller than L and the pressure p1 satisfying $P3 \leq p1$, respectively.

Operations:
(1) The coordinate acquiring section 101 and the pressure acquiring section 102 detects the coordinate c1 and the pressure p1, respectively.
(2) The input judging section 303 judges that a pressure with the pen changes from a pressure smaller than P3 to that not smaller than P3.
(3) After canceling the temporary off-state, the input judging section 303 examines whether the timer 107 operates or not.
(4) As the timer 107 does not operate, the operation terminates.

Operation Example 2-4
Conditions:
- (2-4-1) The coordinate temporary storing section 106 stores the coordinate position c0.
- (2-4-2) The timer 107 does not operate.
- (2-4-3) The input judging section 303 stores the preceding pressure p0 satisfying $p0 < P5$ and initiates the temporary off-state.
- (2-4-4) The coordinate acquiring section 101 and the pressure acquiring section 102 detect the coordinate c1 located apart from the coordinate c0 by a distance smaller than L and the pressure p1 satisfying P5≦p1, respectively.

Operations:

(1) The coordinate acquiring section 101 and the pressure acquiring section 102 detect the coordinate c1 and the pressure p1, respectively.

(2) The input judging section 303 judges that a pressure with the pen changes from a pressure smaller than P5 to that not smaller than P4.

(3) The coordinate temporary storing section 106 stores the coordinate c1 as the timer 107 does not operate. The pen touch operations are qualified as the single tap operation at the coordinate c1.

(4) The input judging section 3 makes the timer 107 start counting.

As apparent particularly from the operation example 2-1, even if the pressure at the end of the first pen touch operation is greater than an ordinary pressure, the two consecutive pen touch operations are completed. At that moment, the distance between the two coordinates is smaller than the reference distance, and the interval time between the two consecutive pen touch operations is smaller than the predetermined time,. Then, if the pressure of the second pen touch operation is greater than a certain pressure, the two consecutive operations are qualified as the double tap operation.

According to the second embodiment, the threshold of the pressure at which the first pen touch operation of the double tap operation changes from being valid to being invalid is greater than an ordinary pressure. And, the threshold of the pressure for judging that the second pen touch operation is valid is also greater than the ordinary one. A user inclines not to release a pen from the touch panel after the first pen touch operation of the double tap operation, such as an input operation with the pen on the touch panel of a portable data terminal. Even if the user does not release the pen enough from the touch panel, the pen touch operations are qualified as the double tap operation.

According to the second embodiment described above, the timer starts counting when the pressure of the first pen touch operation exceeds the pressure P5. The input device according to this embodiment may include a peak detector for detecting a peak of the pressure of the pen touch operation. The timer may start counting when the peak of the pressure of the first pen touch operation is detected after the pressure exceeds P5. Also, the timer may start counting when the pressure of the first pen touch operation changes from P4 to smaller than P4 or changes from more than a predetermined pressure to less than the predetermined pressure.

The pen touch operation according to the embodiments is performed when the operation changes from being invalid to being valid for the single tap operation or the double tap operation. The operation is not limited to that, and may be performed when changing from being valid to being inval.

According to the embodiments, the threshold of a pressure with the pen touch operation at which the operation changes from being invalid to being valid is equal to that at which the operation changes from being valid to being invalid. The two thresholds may be different from each other.

As set forth above, according to the present invention, the pressure used for judging that the second pen touch operation of a double tap operation is valid is smaller than an ordinary pressure, or the pressure used for judging that the first pen touch operation of the double tap operation changes to be off is greater than an ordinary pressure. Consequently, even under the condition that the pen touch operation with a portable data terminal inclines, i.e., the operation is not easily performed, the device enables a user to perform the double tap operation steadily, thus enhancing the effectiveness in actual use.

What is claimed is:

1. An input device comprising:

an input unit for accepting first and second operations;

an operation amount acquiring unit that detects an amount of a property indicative of the first operation and an amount of a property indicative of the second operation;

a timer which starts counting time at a time at which or before which the property indicative of the first operation changes from an amount less than a first threshold amount to an amount equal to or greater than the first threshold amount; and an input judging device which determines a double tap operation to be performed when the property indicative of the second operation changes from an amount less than a second threshold amount to an amount equal to or greater than the second threshold amount before said timer counts a certain time, wherein the second threshold amount is smaller than the first threshold amount.

2. The input device according to claim 1, wherein the timer starts counting time when the property indicative of the first operation changes from an amount less than the first threshold amount to an amount equal to or greater than the first threshold amount.

3. The input device according to claim 1, further comprising a peak detector for detecting a peak of the amount of a property indicative of the first operation, wherein said timer starts counting time when the peak of the amount of a property indicative of the first operation is detected.

4. The input device according to claim 1, wherein the timer starts counting time when the property indicative of the first operation changes from an amount less than a third threshold amount to an amount equal to or greater than the third threshold amount.

5. The input device according to claim 1, further comprising a position acquiring means for detecting a first position of the first operation and a second position of the second operation.

wherein the property indicative of the first operation and the property indicative of the second operation are first and second pressures applied to said input unit at the first and second operations, respectively, and wherein said input judging means judges that the double tap operation is performed when the second pressure changes from less than the second threshold amount to equal to or greater than the second threshold amount before said timer counts the certain time and when a distance between the first and second positions is smaller than a certain distance.

6. The input device according to claim 1, wherein at least one of the amount of the property indicative of the first operation and the amount of the property indicative of the second operation is a magnitude of the property indicative of the first operation or the property indicative of the second operation.

7. The input device according to claim 6, wherein at least one of the property indicative of the first operation and the property indicative of the second operation is a voice sound.

8. The input device according to claim 1, wherein said input judging means judges that the double tap operation is performed when the property indicative of the first operation changes from an amount greater than a fourth threshold amount to an amount less than the fourth threshold amount before said timer counts to certain time and when the property indicative of the second operation changes from less than the second threshold amount to an amount equal to or greater than the second threshold amount before said timer counts the certain time.

9. The input device according to claim 8, wherein the fourth threshold amount is smaller than the second threshold amount.

10. The input device according to claim 8, further comprising position acquiring means for detecting a first position of the first operation and a second position of the second operation,
  wherein the property indicative of the first operation and the property indicative of the second operation are first and second pressures applied to said input unit at the first and second operations, respectively, and
  wherein said input judging means judges that the double tap operation is performed when the first pressure changes from equal to or greater than the fourth threshold amount to less than the fourth threshold amount before said timer counts the certain time, when the second amount changes from less than the second threshold amount to equal to or greater than the second threshold amount before said timer counts the certain time, and when a distance between the first and second positions is smaller than a certain distance.

11. The input device according to claim 8,
  wherein at least one of an amount of the property indicative of the first operation and the amount of the property indicative of the second operation is a magnitude of the property indicative of the first operation or the property indicative of the second operation.

12. The input device according to claim 11, wherein at least one of the property indicative of the first operation and the property indicative of the second operation is a voice sound.

13. The input device according to claim 8, wherein the timer starts counting time when the property indicative of the first operation changes from an amount equal to or greater than a third threshold amount to less than the third threshold amount.

14. The input device according to claim 13, wherein the fourth threshold amount is equal to the third threshold amount.

15. The input device according to claim 1, further comprising position acquiring means for detecting a first position of the first operation and a second position of the second operation,
  wherein the property indicative of the first operation is a duration of the first operation,
  wherein the property indicative of the second operation is a duration of the second operation, and
  wherein said input judging means judges that the double tap operation is performed when the duration of the second operation changes from an amount less than the second threshold amount to an amount equal to or greater than the second threshold amount before said timer counts the certain time and when a distance between the first and second positions is smaller than a certain distance.

16. The input device according to claim 1,
  wherein at least one of the amount of the property indicative of the first operation and the amount of the property indicative of the second operation is a duration of a certain operation.

17. The input device according to claim 16, wherein the certain operation is to input a voice sound.

18. A method of inputting data with an input device having an input unit for accepting first and second operations, said method comprising the steps of:
  detecting an amount of a property indicative of the first operation;
  detecting an amount of a property indicative of the second operation; and
  judging that a double tap operation is performed when the property indicative of the second operation changes from an amount less than a second threshold amount to equal to or greater than the second threshold amount within a certain time from a first time at which or before which the property indicative of the first operation changes from less than a first threshold amount to equal to or greater than the first threshold amount,
  wherein the second threshold amount is smaller than the first threshold amount.

19. The method according to claim 18, wherein the first time is a time at which the property indicative of the first operation changes from an amount less than the first threshold amount to an amount equal to or greater than the first threshold amount.

20. The method according to claim 18, further comprising the step of detecting a peak of the amount of a property indicative of the first operation, wherein the first time is a time when the peak is detected.

21. The method according to claim 18, wherein the first time is a time at which the amount of a property indicative of the first operation changes from equal to or greater than a third threshold amount to less than the third threshold amount.

22. The method according to claim 18, further comprising the steps of:
  detecting a first position of the first operation; and
  detecting a second position of the second operation,
  wherein the property indicative of the first operation and the property indicative of the second operation are first and second pressures applied to said input unit at the first and second operations, respectively, and
  wherein said step of judging that the double tap operation is performed comprises the step of judging that the double tap operation is performed when the second pressure changes from less than the second threshold amount to equal to or greater than the second threshold amount within the certain time from the first time and when a distance between the first and second positions is less than a certain distance.

23. The method according to claim 18,
  wherein at least one of an amount of the property indicative of the first operation and the amount of the property indicative of the second operation is a magnitude of the property indicative of the first operation or the property indicative of the second operation.

24. The method according to claim 23, wherein at least one of the property indicative of the first operation and the property indicative of the second operation is a voice sound.

25. The method according to claim 18, wherein said step of judging that the double tap operation is performed comprises the step of judging that the double tap operation is performed when the property indicative of the first operation changes from equal to or greater than a fourth threshold amount to less than the fourth threshold amount within the certain time from the first time and when the second amount changes from less than the second threshold amount to equal to or greater than the second threshold amount within the certain time from the first time.

26. The method according to claim 25, wherein the fourth threshold amount is less than the second threshold amount.

27. The method according to claim 25, wherein the fourth threshold amount is equal to the third threshold amount.

28. The method according to claim 25, further comprising the steps of:
detecting a first position of the first operation; and
detecting a second position of the second operation,
wherein the property indicative of the first operation and the property indicative of the second operation are first and second pressures applied to said input unit at the first and second operations, respectively, and
wherein said step of judging that the double tap operation is performed comprises the step of judging that the double tap operation is performed when the first pressure changes from equal to or greater than the fourth threshold amount to less than the fourth threshold amount within the certain time from the first time, when the second amount changes from less than the second threshold amount to equal to or greater than the second threshold amount within the certain time from the first time, and when a distance between the first and second positions is less than a certain distance.

29. The method according to claim 25,
wherein at least one of an amount of the property indicative of the first operation and the amount of the property indicative of the second operation is a magnitude of the property indicative of the first operation or the property indicative of the second operation.

30. The method according to claim 29, wherein at least one of the property indicative of the first operation and the property indicative of the second operation is a voice sound.

31. The method according to claim 25, wherein the first time is a time at which the property indicative of the first operation changes from an amount equal to or greater than a third threshold amount to less than the third threshold amount.

32. The method according to claim 18, further comprising the steps of:
detecting a first position of the first operation; and
detecting a second position of the second operation,
determining the duration of the first and second operations,
wherein the property indicative of the second operation is a duration of the second operation, and
wherein said step of judging that the double tap operation is performed comprises the step of judging that the double tap operation is performed when the property indicative of the second operation changes from less than the second threshold amount to equal to or greater than the second threshold amount within the certain time from the first time and when a distance between the first and second position is smaller than a certain distance.

33. The method according to claim 18,
wherein the property indicative of the first operation and the property indicative of the second operation are respective durations of the first and second operations.

34. The method according to claim 33, wherein at least one of the property indicative of the first operation and the property indicative of the second operation is a voice sound.

35. A program for instructing an input device to execute a method of inputting data, the input device having an input unit for accepting first and second operations, said method comprising the steps of:
detecting a first pressure and a first position of the first operation;
detecting a second pressure and a second position of the second operation; and
judging that a double tap operation is performed when the second pressure changes from less than a second threshold amount to equal to or greater than the second threshold amount within a certain time from a first time at which or before which the first pressure changes from less than a first threshold amount to equal to or greater than the first threshold amount and when a distance between the first and second positions is smaller than a certain distance,
wherein the second threshold amount is smaller than the first threshold amount.

36. The program according to claim 35, wherein the first time is a time at which the first pressure changes from less than the first threshold amount to equal to or greater than the first threshold amount.

37. The program according to claim 35, wherein said method further comprises the step of detecting a peak amount of the first pressure, and the first time is a time when the peak amount is detected.

38. A program for instructing an input device to execute a method of inputting data, the input device having an input unit for accepting first and second operations, said method comprising the steps of:
detecting a first pressure and a first position of the first operation;
detecting a second pressure and a second position of the second operation; and
judging that a double tap operation is performed when the second pressure changes from less than a second threshold amount to equal to or greater than the second threshold amount within a certain time from a first time at which or before which the first pressure changes from less than a first threshold amount to equal to or greater than the first threshold amount and when a distance between the first and second positions is smaller than a certain distance.
wherein the first time is a time at which the first pressure changes from equal to or greater than a third threshold amount to less than the third threshold amount.

39. A program for instructing an input device to execute a method of inputting data, the input device having an input unit for accepting first and second operations, said method comprising the steps of:
detecting a first pressure and a first position of the first operation;
detecting a second pressure and a second position of the second operation; and
judging that a double tap operation is performed when the second pressure changes from less than a second threshold amount to equal to or greater than the second threshold amount within a certain time from a first time at which or before which the first pressure changes from less than a first threshold amount to equal to or greater than the first threshold amount and when a distance between the first and second positions is smaller than a certain distance,
wherein said step of judging that the double tap operation is performed comprises the step of judging that the double tap operation is performed when the first pressure changes from equal to or greater than a fourth threshold amount to less than the fourth threshold amount within the certain time from the first time, when the second pressure changes from less than the second threshold amount to equal to or greater than the second threshold amount within the certain time from the first time, and when a distance between the first and second positions is smaller than the certain distance.

40. The program according to claim 39, wherein the fourth threshold amount is smaller than the second threshold amount.

41. The program according to claim 39, wherein the first time is a time at which the first pressure changes from an amount equal to or greater than a third threshold amount to less than the third threshold amount.

42. The program according to claim 41, wherein the fourth threshold amount is equal to the third threshold amount.

43. A recording medium for storing a program which instructs an input device to execute a method of inputting data, the input device having an input unit for accepting first and second operations, said recording medium being readable for the input device, said method comprising the steps of:
 detecting a first pressure and a first position of the first operation;
 detecting a second pressure and a second position of the second operation; and
 judging that a double tap operation is performed when a second pressure changes from less than a second threshold amount to equal to or greater than the second threshold amount within a certain time from a first time at which or before which the first pressure changes from less than a first threshold amount to equal to or greater than the first threshold amount and when a distance between the first and second positions is smaller than a certain distance,
 wherein the second threshold amount is smaller than the first threshold amount.

44. The recording medium according to claim 43, wherein the first time is a time at which the first amount changes from less than the first threshold amount to equal to or greater than the first threshold amount.

45. The recording medium according to claim 43, wherein said method further comprises the step of detecting a peak amount of the first pressure, and the first time is a time when the peak amount is detected.

46. A recording medium for storing a program which instructs an input device to execute a method of inputting data, the input device having an input unit for accepting first and second operations, said recording medium being readable for the input device, said method comprising the steps of:
 detecting a first pressure and a first position of the first operation;
 detecting a second pressure and a second position of the second operation; and
 judging that a double tap operation is performed when a second pressure changes from less than a second threshold amount to equal to or greater than the second threshold amount within a certain time from a first time at which or before which the first pressure changes from less than a first threshold amount to equal to or greater than the first threshold amount and when a distance between the first and second positions is smaller than a certain distance,
 wherein the first time is a time when the first pressure changes from equal to or greater than the third threshold amount to less than the third threshold amount.

47. A recording medium for storing a program which instructs an input device to execute a method of inputting data, the input device having an input unit for accepting first and second operations said recording medium being readable for the input device, said method comprising the steps of:
 detecting a first pressure and a first position of the first operation;
 detecting a second pressure and a second position of the second operation; and
 judging that a double tap operation is performed when a second pressure changes from less than a second threshold amount to equal to or greater than the second threshold amount within a certain time from a first time at which or before which the first pressure changes from less than a first threshold amount to equal to or greater than the first threshold amount and when a distance between the first and second positions is smaller than a certain distance,
 wherein said step of judging that the double tap operation is performed comprises the step of judging that the double tap operation is performed when the first pressure changes from equal to or greater than a fourth threshold amount to less than the fourth threshold amount within the certain time from the first time, when the second pressure changes from less than the second threshold amount to equal to or greater than the second threshold amount within the certain time from the first time, and when the distance between the first and second positions is smaller than the certain distance.

48. The recording medium according to claim 47, wherein the fourth threshold amount is smaller than the second threshold amount.

49. The recording medium according to claim 47, wherein the first time is a time at which the first pressure changes from an amount equal to or greater than a third threshold amount to less than the third threshold amount.

50. The recording medium according to claim 49, wherein the fourth threshold amounts is equal to the third threshold amount.

51. A program for instructing a computer to execute a method of inputting data, the computer being coupled with an input device having an input unit for accepting first and second operations said method comprising the steps of:
 detecting a first pressure and a first position of the first operation;
 detecting a second pressure and a second position of the second operation; and
 judging that a double tap operation is performed when a second pressure changes from less than a second threshold amount to equal to or greater than the second threshold amount within a certain time from a first time at which or before which the first pressure changes from less than a first threshold amount to equal to or greater than the first threshold amount and when a distance between the first and second positions is smaller than a certain distance,
 wherein the second threshold amount is smaller than the first threshold amount.

52. The program according to claim 51, wherein the first time is a time at which the first pressure changes from less than the first threshold amount to equal to or greater than the first threshold amount.

53. The program according to claim 51, wherein said method further comprises the step of detecting a peak amount of the first pressure, and the first time is a time when the peak amount is detected.

54. A program for instructing a computer to execute a method of inputting data, the computer being coupled with an input device having an input unit for accepting first and second operations said method comprising the steps of:
- detecting a first pressure and a first position of the first operation;
- detecting a second pressure and a second position of the second operation; and
- judging that a double tap operation is performed when a second pressure changes from less than a second threshold amount to equal to or greater than the second threshold amount within a certain time from a first time at which or before which the first pressure changes from less than a first threshold amount to equal to or greater than the first threshold amount and when a distance between the first and second positions is smaller than a certain distance,
- wherein the first time is a time when the first pressure changes from equal to or greater than a third threshold amount to less than the third threshold amount.

55. A program for instructing a computer to execute a method of inputting data, the computer being coupled with an input device having an input unit for accepting first and second operations, said method comprising the steps of:
- detecting a first pressure and a first position of the first operation;
- detecting a second pressure and a second position of the second operation; and
- judging that a double tap operation is performed when a second pressure changes from less than a second threshold amount to equal to or greater than the second threshold amount within a certain time from a first time at which or before which the first pressure changes from less than a first threshold amount to equal to or greater than the first threshold amount and when a distance between the first and second positions is smaller than a certain distance,
- wherein said step of judging that the double tap operation is performed comprises the step of judging that the double tap operation is performed when the first pressure changes from equal to or greater than a fourth threshold amount to less than the fourth threshold amount within the certain time from the first time, when the second pressure changes from less than the second threshold amount to equal to or greater than the second threshold amount within the certain time from the first time, and when the distance between the first and second positions is smaller than the certain distance.

56. The program according to claim 55, wherein the fourth threshold amount is smaller than the second threshold amount.

57. The program according to claim 55, wherein the first time is a time at which the first pressure changes from an amount equal to or greater than a third threshold amount to less than the third threshold amount.

58. The program according to claim 57, wherein the fourth threshold amount is equal to the third threshold amount.

59. A recording medium for storing a program which instructs a computer to execute a method of inputting data, the computer being coupled with an input device having an input unit for accepting first and second operations, said recording medium being readable for the computer, said method comprising the steps of:
- detecting a first pressure and a first position of the first operation;
- detecting a second pressure and a second position of the second operation; and
- judging that a double tap operation is performed when the second pressure changes from less than a second threshold amount to equal to or greater than the second threshold amount within a certain time from a first time at which or before which the first pressure changes from less than a first threshold amount to equal to or greater than the first threshold amount and when a distance between the first and second positions is smaller than a certain distance,
- wherein the second threshold amount is smaller than the first threshold amount.

60. The recording medium according to claim 59, wherein the first time is a time at which the first pressure changes from less than the first threshold amount to equal to or greater than the first threshold amount.

61. The recording medium according to claim 59, wherein said method further comprises the step of detecting a peak amount of the first pressure, wherein the first time is a time when the peak amount is detected.

62. A recording medium for storing a program which instructs a computer to execute a method of inputting data, the computer being coupled with an input device having an input unit for accepting first and second operations, said recording medium being readable for the computer, said method comprising the steps of:
- detecting a first pressure and a first position of the first operation;
- detecting a second pressure and a second position of the second operation; and
- judging that a double tap operation is performed when the second pressure changes from less than a second threshold amount to equal to or greater than the second threshold amount within a certain time from a first time at which or before which the first pressure changes from less than a first threshold amount to equal to or greater than the first threshold amount and when a distance between the first and second positions is smaller than a certain distance,
- wherein the first time is a time when the first pressure changes from equal to or greater than a third threshold amount to less than the third threshold amount.

63. A recording medium for storing a program which instructs a computer to execute a method of inputting data, the computer being coupled with an input device having an input unit for accepting first and second operations, said recording medium being readable for the computer, said method comprising the steps of:
- detecting a first pressure and a first position of the first operation;
- detecting a second pressure and a second position of the second operation; and
- judging that a double tap operation is performed when the second pressure changes from less than a second threshold amount to equal to or greater than the second threshold amount within a certain time from a first time at which or before which the first pressure changes from less than a first threshold amount to equal to or greater than the first threshold amount and when a distance between the first and second positions is smaller than a certain distance, wherein said step of judging that the double tap operation is performed comprises the step of judging that the double tap operation is performed when the first pressure changes from equal to or greater than a fourth threshold amount to less than the fourth threshold amount within the certain time from the first time, when the second pressure changes from less than the second threshold amount to equal to or greater than the second threshold amount within the certain time from the first time, and when the distance between the first and second positions is smaller than the certain distance.

64. The recording medium according to claim 63, wherein the fourth threshold amount is smaller than the second threshold amount.

65. The recording medium according to claim 63, wherein the first time is a time at which the first pressure changes from an amount equal to or greater than a third threshold amount to less than the third threshold amount.

66. The recording medium according to claim 65, wherein the fourth threshold amount is equal to the third threshold amount.

\* \* \* \* \*